United States Patent [19]

Tokumaru et al.

[11] Patent Number: 4,951,075

[45] Date of Patent: Aug. 21, 1990

[54] ZOOM CAMERA

[75] Inventors: Hisashi Tokumaru; Hisayuki Masumoto; Yukio Maekawa, all of Osaka, Japan

[73] Assignee: Minolta Camera Kabushiki Kaisha, Osaka, Japan

[21] Appl. No.: 294,121

[22] Filed: Jan. 6, 1989

[30] Foreign Application Priority Data

Jan. 8, 1988 [JP] Japan .................................. 63-2990
Mar. 11, 1988 [JP] Japan .................................. 63-58975

[51] Int. Cl.$^5$ ............................................. G03B 13/36
[52] U.S. Cl. .................................. 354/400; 354/195.1
[58] Field of Search ...................... 354/400, 402, 195.1

[56] References Cited

U.S. PATENT DOCUMENTS

| 4,043,642 | 8/1977 | Hirose et al. ..................... 354/195.1 |
| 4,728,980 | 3/1988 | Nakamura et al. ................. 354/402 |
| 4,748,509 | 5/1988 | Otake et al. ....................... 354/400 |
| 4,816,859 | 3/1989 | Maruyama et al. ................. 354/400 |
| 4,825,237 | 4/1987 | Hatase et al. ...................... 354/402 |
| 4,829,331 | 5/1989 | Aihara ............................... 354/402 |

FOREIGN PATENT DOCUMENTS

| 53-113527 | 10/1978 | Japan . |
| 55-64204 | 5/1980 | Japan . |
| 60-1602 | 1/1985 | Japan . |
| 60-4911 | 1/1985 | Japan . |
| 60-218631 | 11/1985 | Japan . |
| 61-230127 | 10/1986 | Japan . |
| 62-69224 | 4/1987 | Japan . |
| 62-118328 | 5/1987 | Japan . |

Primary Examiner—Russell E. Adams
Attorney, Agent, or Firm—Burns, Doane, Swecker & Mathis

[57] ABSTRACT

In a zoom camera disclosed, a memory of an auto-zooming program lines is provided in which a relation between the object distance and the image mangification added with an element of the depth of field is set in a predetermined manner according to each kind of photographing mode, and such a focal length of a focusing lens is computed that the image mangification is set to be a predetermined value based on the object distance and a program line of a photographing mode selected by a user, whereby the focusing lens is driven so as to obtain the focal length. Consequently, auto-zoom photographing at a depth of field and an image magnification suitable for each kind of photographing mode can be achieved. Further, a memory of program lines set according to the vertical and horizontal camera attitudes in photographing is provided, and the image mangification can be changed over according to each camera attitude.

22 Claims, 21 Drawing Sheets

ZOOM CAMERA

BACKGROUND OF THE INVENTION

The present invention relates to a zoom camera in which the image magnification is variable in accordance with the object distance and the depth of field.

Cameras having a zoom lens system capable of photographing with constant image magnification are conventionally known.

For example, in an apparatus shown in Japanese Laid-Open Patent Publication (Tokkaisho) No. 53-113527, a position of a variator lens group with which images of a constant image magnification can be obtained even if the object distance changes is computed and set based on the object distance and the image magnification.

While, in an automatic zooming operation, besides the abovementioned constant image magnification, it has been sometimes desired to obtain photographic images having a depth and sense of perspective, and to realize a zoom camera by which such photographic images can be obtained.

Further, in the zoom cameras of a constant image magnification as shown in the prior art, the image magnification is constant whether the camera attitude is vertical or horizontal. As a result, when persons gather so as to be framed in the photographing scene of a camera in the horizontal attitude and then the camera attitude is turned to the vertical one, persons at the periphery are apt to be disadvantageously put out of the photographing scene. Further, when the upper half body of a person is framed in the photographing scene of a camera in the vertical attitude, and then the camera attitude is turned to the horizontal one, the head of the person is apt to be disadvantageously put out of the photographing scene. On the contrary, when all persons are framed or the head of a person is also framed in the photographing scene of a camera, a target object becomes too small in size with respect to the photographing scene, or undesired objects disadvantageously come into the photographing scene.

SUMMARY OF THE INVENTION

A first object of the present invention is to meet the abovementioned demands by providing a zoom camera by which, through zooming operation, a picture having a large depth of field with even a background of an object being in in-focus, or a picture in which a main object stands out clearly with a background shaded off can be obtained.

According to a zoom camera of the present invention, an image magnification setting means for setting the image magnification in accordance with a predetermined program based on the object distance and the depth of field is used, and a focal length is computed from a value of the image magnification setting means and a detected object distance so as to obtain a specified image magnification whereby a lens is driven. Accordingly, such zooming can be achieved in accordance with the object distance and the depth of field as enabling to take a picture having a large depth of field with even a background of an object being in in-focus, or a picture in which a main objects stands out clearly with a background shaded off, that is, enabling to easily take a picture having a depth and sense of perspective which is advantageous for taking snapshots or portraits.

A second object of the present invention is to provide a zoom camera in which by detecting whether the camera attitude is vertical or horizontal and changing over two program lines for the vertical and horizontal camera attitudes respectively, a target object can be within a photographing scene of the camera in the vertical or horizontal attitude with an appropriate size ratio of the target object to the respective photographing scene when the camera attitude is turned from vertical to horizontal or from horizontal to vertical, and further, it can be prevented that undesired objects come into the photographing scene even if the camera attitude is changed.

In a camera of the present invention, since the image magnification is changed over according to the vertical or horizontal camera attitude, zooming with an appropriate image magnification with respect to a photographing scene of the camera either in the vertical or horizontal attitude even if the camera attitude is changed before photographing. Further, since it can be prevented that undesired objects come into the photographing scene or that a part of a target object is cut off even if the camera attitude is changed, a user can concentrate his attention on framing a target object and seizing shutter release opportunities with freely changing the camera attitude, and can enjoy easy photographing.

BRIEF DESCRIPTION OF THE DRAWINGS

FIG. 4 (b) shows a line approximating to the LZP program diagram of FIG. 4 (a);

DETAILED DESCRIPTION OF PREFERRED EMBODIMENTS OF THE INVENTION

Figure 1:
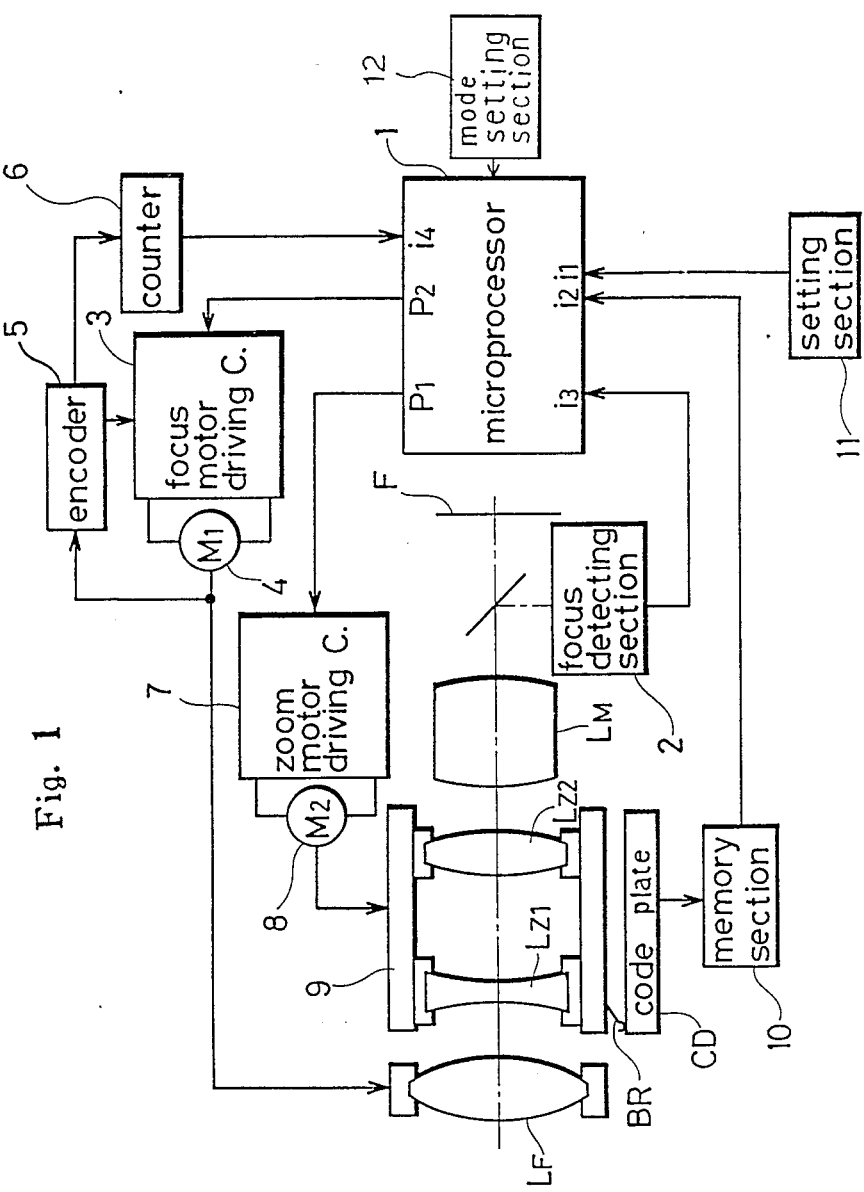
FIG. 1 is a view showing the arrangement of a zoom camera of an the present invention.

FIG. 1 shows an arrangement of an embodiment of the present invention. In FIG. 1, a photographing zoom lens is constituted of lens groups $L_F$, $L_{Z1}$, $L_{Z2}$, and $L_M$, $L_F$ indicates a focusing lens group. By moving the focusing lens group on the optical axis, objects in positions from the infinitely far position to the nearest photographing position, can be focused. $L_{Z1}$, $L_{Z2}$ indicate a zooming lens group or a variator lens group. By moving the variator lens group $L_{Z1}$, $L_{Z2}$ on the optical axis in specified manners respectively, the focal length of the zooming lens varies from the shortest one to the longest one. $L_M$ indicates a master lens group used for focusing images on a film plane F. A focus detecting section 2 receives a branched flux of an optical ray passing through exit pupil of the photographing zoom lens and converts analogue data indicative of an amount of receive light into digital data to feed them to a microprocessor 1.

A focus motor driving circuit 3 controllingly drives a motor 4 in accordance with a rotation amount signal fed from the microprocessor 1 to move the focusing lens group $L_F$ in the direction of the optical axis thereof. At this time, an encoder 5 monitors the rotation of the motor 4, and feeds a pulse each time the motor 4 is rotated by a predetermined rotation to the focus motor driving circuit 3. The focus motor driving circuit 3 counts the pulses fed from the encoder 5 and stops the drive of the motor 4 when the pulses fed from the encoder reaches the value corresponding to the rotation amount signal fed from the microprocessor 1. A counter 6 counts pulses fed from the encoder 5 generated after the focusing lens group $L_F$ is driven from the lens retraction position ($\infty$) and feeds the count value to the microprocessor 1.

A zoom motor driving circuit 7 receives signals from the microprocessor 1 to drive and control a motor 8 and controls a zoom operating section 9. The zoom operating section 9 moves the variator lens group $L_{Z1}$, $L_{Z2}$ to a specified position by means of moving members such as cams, gears or the like connected to a holding member for holding the variator lens group $L_{Z1}$, $L_{Z2}$. The zoom operating section 9 has a brush BR which contacts with a code pattern formed on a code plate CD. The brush BR and the code plate CD constitute an encoder. The encoder issues digital coded data representing the position of the zoom operating section 9, that is, the present focal length of the zoom lens and feeds the digital data to a memory section 10. The memory section 10 is constituted by ROM, which stores focal length data in addresses designated by the digital data and feeds the focal length data stored in the designated address to the microprocessor 1. Further, the memory section 10 stores other lens data peculiar to the camera lens, for example, rotational amount converting data ($\Delta d/\Delta L$), the longest focal length data ($f_F$), and shortest focal length data ($f_N$).

A setting section 11 feeds a mode signal of either usual zooming operation or programmed auto-zooming operation based on a manual operation to a mode switch S1, to the microprocessor 1. In usual zooming operation mode, a manual signal commanding a manually zooming operation to a longer or shorter focal length direction based on a manual operation to zooming direction switches (not shown) is fed through the microprocessor 1 to the zoom motor driving circuit 7 to drive the motor 8. When a programmed auto-zooming operation mode is selected by the setting section 11, and then a user selects a desired auto-zooming program diagram, a mode setting section 12 feeds a signal of the diagram (through an input terminal i5) to the microprocessor 1. On the other belowmentioned specified computation is executed in the microprocessor 1, and a control signal is fed to the zoom motor driving circuit 7 to controllingly drive the motor 8.

There are a plurality of abovementioned program diagrams. For example, there are a mode (AZP) suitable for snapshot of a person in daily life, a mode (LZP) suitable for scenery photography, a mode (PZP) suitable for portrait photography, a mode (SZP) suitable for photographing moving objects and the like.

Now, the arrangement of the microprocessor 1 will be described in detail with reference to FIG. 2.

Figure 2:
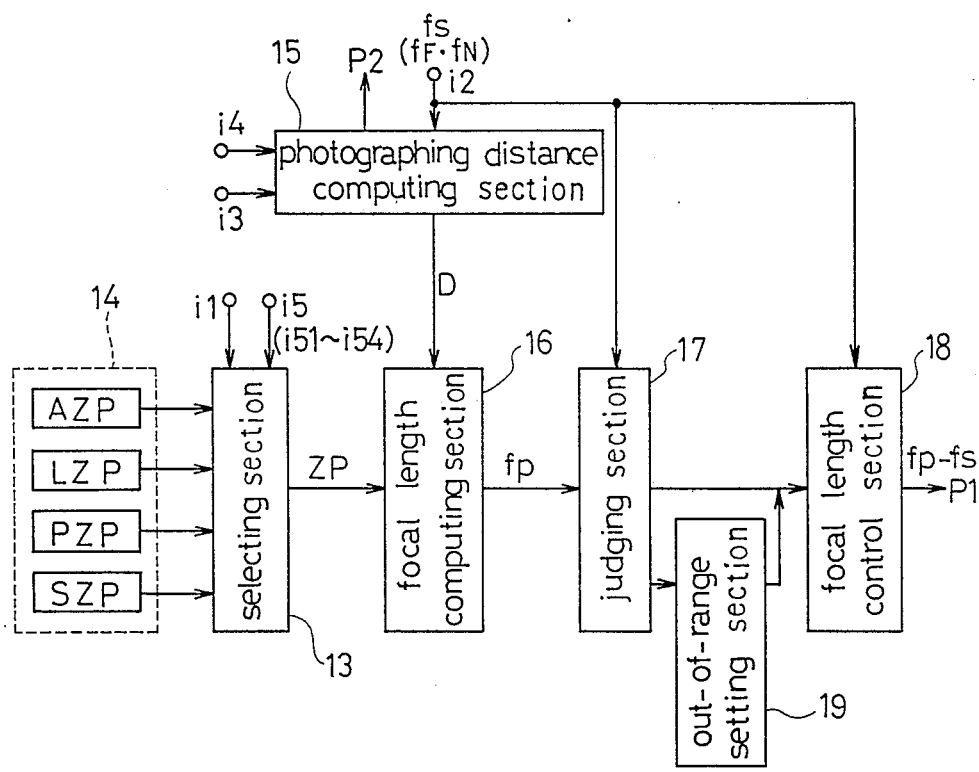
FIG. 2 is a view showing the arrangement of a microprocessor of the embodiment.

In FIG. 2, a selecting section 13 selects a program diagram out of a memory section 14 in which a plurality of auto-zooming program diagrams are stored, based on an operation mode and a programmed auto-zooming selection mode inputted through the input terminals i1, i5 respectively, and outputs the selected program diagram. A photographing distance computing section 15 outputs, from an output terminal $P_2$, a signal indicating a focus motor rotational amount computed based on data inputted through input terminals i2, i3, respectively, and on the other hand, outputs a photographing distance data D computed based on a count value n of the counter 6 inputted through an input terminal i4.

A focal length computing section 16 computes a focal length data $f_P$ based on the abovementioned program diagram and the object distance data D, and outputs the data $f_P$. A judging section 17 compares the focal length data $f_P$ with the abovementioned focal length data $f_F$, $f_N$ inputted through the input terminal i2. When the data $f_P$ is within the range from the data $f_N$ to the data $f_F$, the judging section 17 outputs the data $f_P$ to a focal length control section 18, and when the data $f_P$ is out of the range from the data $f_N$ to the data $f_F$, it outputs the data $f_P$ to an out-of-range setting section 19. The focal length control section 18 computes the difference between the data $f_P$, the data $f_F$ or the data $f_N$ and a focal length data $f_S$ successingly renewed and inputted through the input terminal i2, and outputs the difference as a signal indicating a zoom motor rotational amount from an output terminal $P_1$. The out-of-range setting section 19 outputs the data $f_F$ or the data $f_N$ in accordance with the data $f_P$ inputted from the judging section 17 to the focal length control section 18.

Now, the output and input data of the microprocessor 1 will be described in the following.

The operation mode of the setting section 11 is detected at the input terminal i1. In programmed autozooming operation mode, the mode switch S1 of the setting section 11 is turned ON and a signal i1=0 is inputted through the input terminal i1. On the other hand, in usual zooming operation mode, a signal i1=1 is inputted therethrough. The selected mode of the mode setting section 12 is inputted through the input terminal i5 into the selecting section 13. And the selecting section 13 selectively inputs a program diagram (AZP, LZP, PZP or SZP) from the memory section 14 in correspondence with the signal (i51, i52, i53 or i54) inputted through the input terminal i5, and outputs the same to the focal length computing section 16. Further, lens data peculiar to the zoom lens and focal length data varying momentarily in accordance with the zooming operation are successively transferred from the memory section 10 to an input terminal i2 to be successively stored in a memory of the microprocessor 1. Further, digital data from the focus detecting section 2 are inputted through the input terminal i3. In accordance with the data inputted through the input terminal i3, a defocus amount (out-of-focus amount) and the direction thereof are computed in the microprocessor 1. Further, in accordance with the defocus data and the data $\Delta d/\Delta L$ inputted through the input terminal i2, the focus driving rotational amount is computed. A focus driving rotational amount signal is outputted through an output terminal $P_2$ to the driving circuit 3. The driving circuit 3 controllingly drives the motor 4 in accordance with the focus driving rotational amount signal till the focusing lens group $L_F$ is in in-focus position. And the count value n of the counter 6 is inputted through the input terminal i4 to the photographing distance computing section 15. The photographing distance computing section 15 computes the object distance D from the abovementioned count value n when the focusing lens group $L_F$ is in in-focus. In other words, the relations between the shifted amount x' of the lens from the retraction position, the object distance D and the focal length f are approximately represented by the following formula.

$$f^2/D \approx x'$$

Here, the count value n of the counter 6 which counts pulses of the encoder 5 from the most retracted position ($\infty$) to the present position of the camera lens and the shifted amount x' of the lens are generally in proportion to each other and the following formula is obtained.

$$n = ax' (a = constant)$$

From theses formulas, the following formula can be obtained.

$$1/D = (1/f^2 a) \cdot n$$

When a coefficient determined by each of the camera lens is represented by k, the data $k/f^2 a$ is peculiar to the camera lens. This data $k/f^2 a$ is held in the memory section 10 and inputted through the input terminal i2 in the object distance computing means 15. In the object distance computing means i5, the object distance D is computed by substituting the data $k/f^2 a$ inputted through the input terminal i2 and the count value n of the counter 6 inputted through the input terminal i4 into the abovementioned formula, and the computed object distance D is inputted in the focal length computing means 16.

In the focal length computing means 16, a corresponding focal length data $f_P$ is computed based on the program diagram $f_P = f(D)$ determined by the photographing distance data D and a diagram signal ZP outputted from the selecting section 13, and the data $f_P$ is inputted in the judging section 17. Then, in the judging section 17, the data $f_P$ is compared with the data $f_F, f_N$.

When $f_P$ is within the range from $f_F$ to $f_N$, the judging section 17 outputs the data $f_P$ to the focal length control section 18, and when $f_P$ is out of the range from $f_F$ to $f_N$, the data $f_F$ or $f_N$ is outputted from the out-of-range setting section 19 to the focal length control section 18. In the focal length control section 18, the difference $f_P - f_S$ between the data $f_P$ inputted from the judging section 17 or the data $f_F$ or $f_N$ inputted from the out-of-range setting section 19 (generically referred to as $f_P$) and the focal length data $f_S$ successively renewed and inputted the input terminal i2 is computed, and the difference $f_P - f_S$ is outputted as a zooming motor driving rotational amount signal through the output terminal $P_1$.

Figure 3:
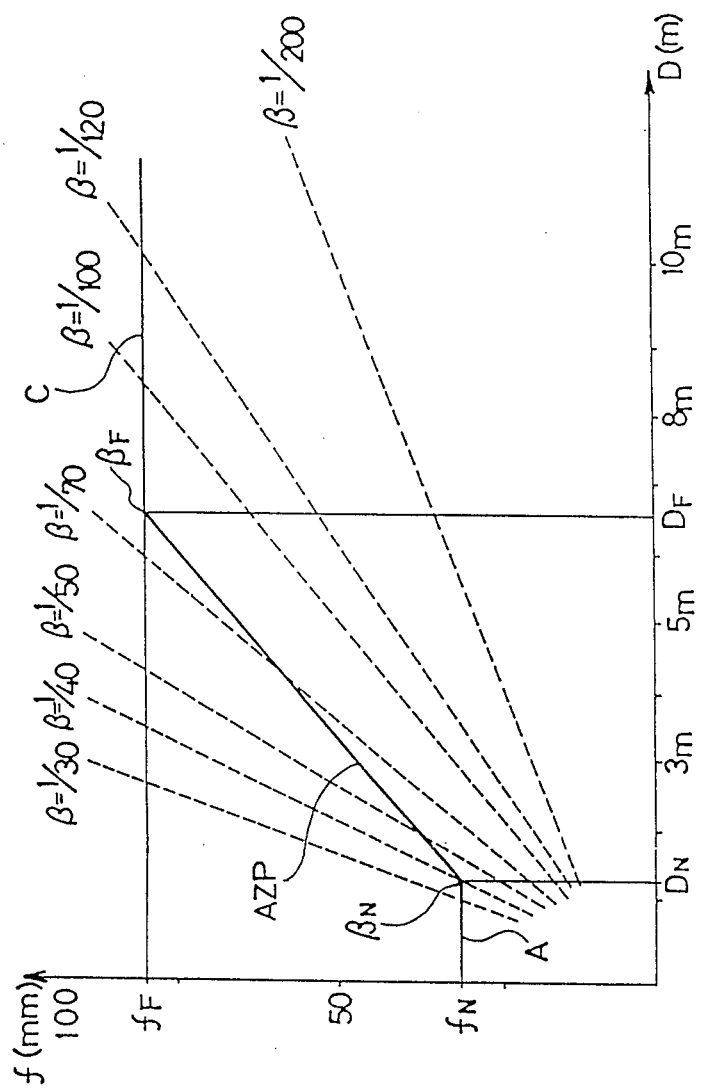
FIG. 3 is a program diagram of a mode (AZP) suitable for snapshot camera of the embodiment.

Now, the auto-zooming program diagram will be described. FIG. 3 is a program diagram of a mode (AZP) suitable for snapshot, namely, a graph showing the relation between the object distance D and the focal length f using the image magnification $\beta$ as a parameter. When D and f change on a broken line, the image magnification $\beta = f/D$ becomes constant.

Here, it will be described with reference to FIG. 7 that the formula $\beta = f/D$ is realized in the optical system shown in FIG. 1.

Figure 7:
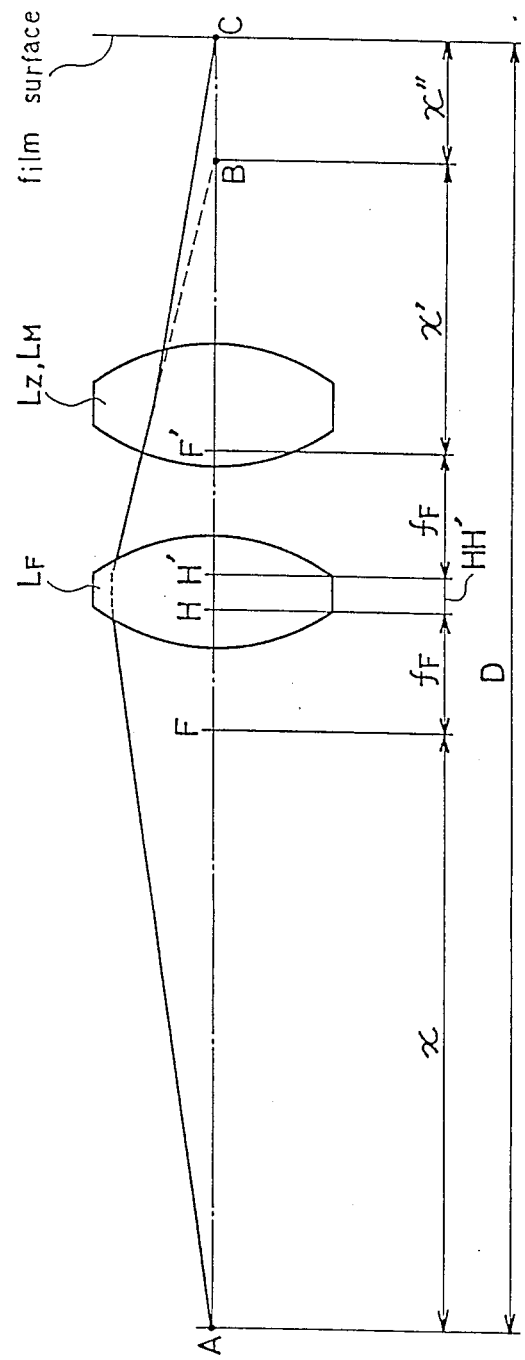
FIG. 7 is a view of an optical system part for explaining a principle of auto-zooming program.

In FIG. 7, the following formula is obtained.

$$D = x + 2f_F + HH' + x' + x''$$

Here, since $x = f_F/\beta_F$, $x' = -f_F \cdot \beta_F$, the abovementioned formula is represented by the following formula.

$$\begin{aligned} D &= f_F/\beta_F + 2f_F + HH' - f_F \cdot \beta_F + x'' \\ &= f_F(2 + 1/\beta_F - \beta_F) + HH' + x'' \end{aligned} \quad (1)$$

Here, in the case of $\beta < 1/10$, since $2 + 1/\beta_F - \beta_F \approx 1/\beta_F$, $HH' << D, x'' << D$, the following formula is obtained.

$$D = f_F/\beta_F \quad (2)$$

Further, since $f = f_F \beta_Z$, $\beta = \beta_F \cdot \beta_Z$ a formula $D = f/\beta$ is obtained. When the image magnification of a zoom lens is not extremely large, that is, in usual photographing such as taking a portrait or a snapshot, the relation $\beta = f/D$ is realized.

In FIG. 7, the indications are as follows.
$L_F$: focusing lens group
$f_F$: focal length of focusing lens
$HH'$: axial distance between principal points of focusing lens
$\beta_F$: magnification of focus lens (not shown)
$L_2$: variator lens
$L_M$: master lens
$\beta_Z$: magnification of variator lens and master lens
F,F': focal position of focusing lens
A: position of object point
B: position of image focused by lens
D: distance from film plane to object (object distance)
x'': distance from image point of focusing lens to film plane
f: focal length of whole system (not shown)
$\beta$: image magnification of whole system (not shown)

Now, returning to FIG. 3, the full line is APZ program diagram of an embodiment of the present invention. The focal length range is represented by a range from one end $f_F$ mm on the telephoto (tele) side to the other end $f_N$ mm on the wide angle (wide) side. When an object to be photographed is in a position with an object distance smaller than $D_N$ m, it is on a line with the fixed focal length $f_N$ mm (line A in FIG. 3), and the image magnification largely varies. When an object is in a position with object distance between $D_N$ and $D_F$, the focal length varies with a specified relation to the image magnification based on with the object distance. In other words, when the object distance is $D_N$ on near side, the focal length is set at the wide side end $f_N$ to make the image magnification $\beta_N = f_N/D_N$. And when the object distance is $D_F$ on the far side, the focal length is set at the tele side end $f_F$ to make the image magnification $\beta_F = f_F/D_F$. The relation between $\beta_N$ and $\beta_F$ is $\beta_N \neq \beta_F$ and $\beta_N > \beta_F$. In other words, when the object is on the near side, a large-size of object image is obtained in a picture, and when the object is on the far side, a small-size of object image is obtained in a picture. However, the image magnification does not so much vary as the object distance varies with the focal length being fixed, but it varies within a small range about a fixed value. The change of the image magnification is such that, in photographing a portrait, the upper half a human body is photographed in a picture when an object is on the near side and the whole body is photographed when the object is on the far side. A line connecting points at which $\beta_N > \beta_F$ is AZP in FIG. 3. When an object is in a position having an object distance larger than $D_F$, the image magnification $\beta$ largely varies on a line C with the fixed focal length $f_F$ mm.

Now, the computation of a program diagram $f_{AZP} = f(D)$ shown in FIG. 3 will be described in the following. It is considered that the line AZP represents a formula $f_{AZP} = mD + n$. Here, since $$m = (f_F - f_N)/(D_F - D_N)$$

$$n = (f_N D_F - f_F D_N)/(D_F - D_N),$$

and $f = \beta D$, m and n can be represented as follows by using $\beta_N$, $\beta_F$, $D_N$ and $D_F$.

$$m = (\beta_F \cdot D_F - \beta_N \cdot D_N)/(D_F - D_N)$$

$$n = [D_N D_F (\beta_N - \beta_F)]/(D_F - D_N)$$

Line A represents $f_P = f_N$ and line C, $f_P = f_F$. They are also $f_P = \beta_N \cdot D_N$, and $f_P = \beta_F \cdot D_F$.

Further, m and n can be represented as follows by using $\beta_N$, $\beta_F$, $f_N$ and $f_F$.

$$m = \beta_n \beta_F (f_F - \beta_N)/(\beta_N f_F - \beta_F f_N)$$

$$n = f_N f_F (\beta_N - \beta_F)/(\beta_F f_N)$$

Line A represents a formula $f_P = f_N$, and Line C, $f_p = f_F$.

Figure 4:
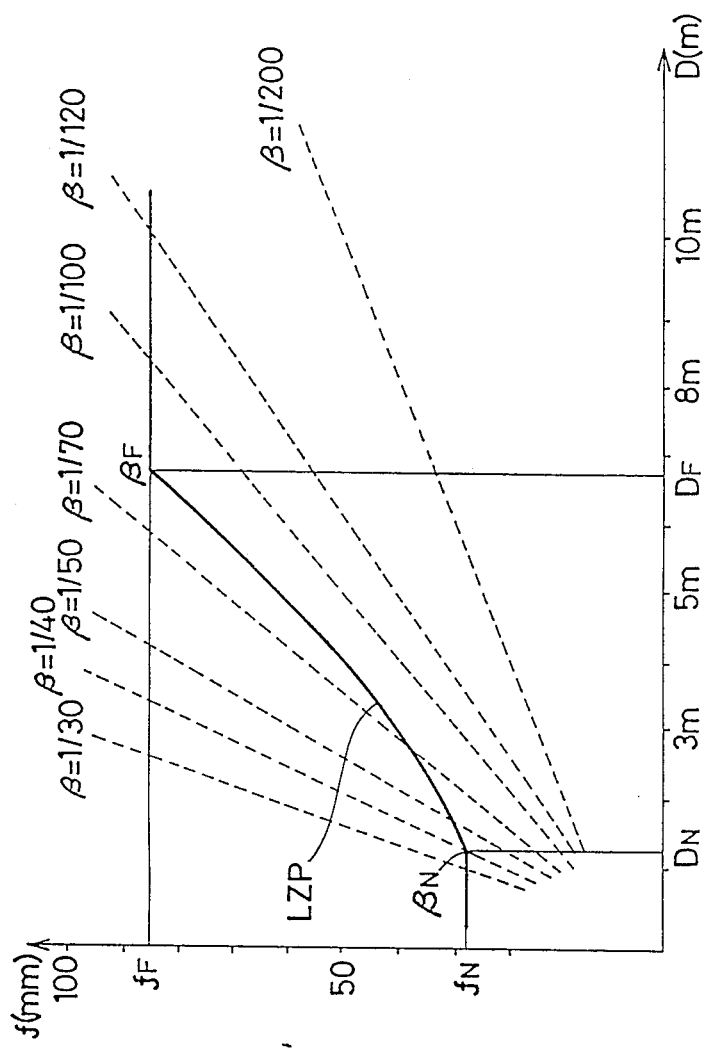
FIG. 4 (a) is a program diagram of a mode (LZP) suitable for scenic photography.
Figure 4:
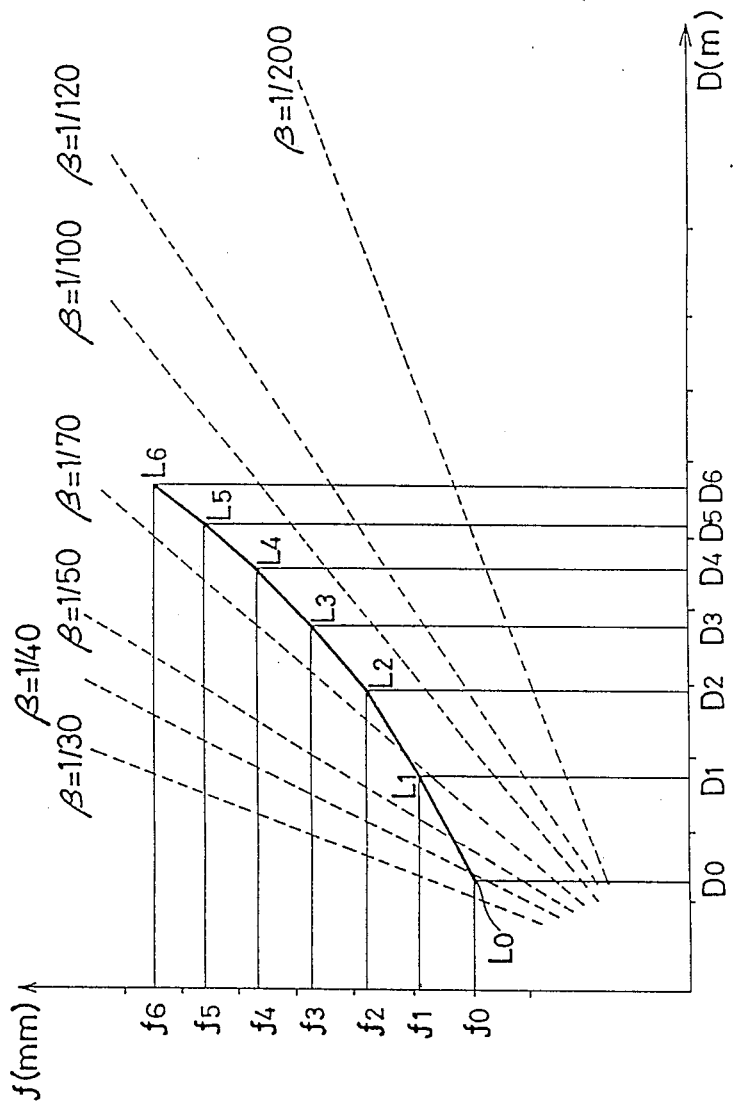

FIG. 4(a) is a program diagram of a mode (LZP) suitable for scenic photography.

On LZP diagram, similarly on AZP diagram, the relation between $\beta_N$ and $\beta_F$ is $\beta_N > \beta_F$ with $\beta_N \neq \beta_F$, and an element of the depth of field is added. In other words, LZP diagram is set as a curved line shifted at the side of small focal length to the large object distance side, namely, the low image magnification side so that the depth of field of the LZP diagram is larger than that of the abovementioned usual AZP diagram. Further, this curved line of LZP diagram is divided into a plurality of section as shown in FIG. 4(b), and each section can be approximated to a straight line. In other words, dividing points $L_0, L_1, L_2 \ldots, L_n$ are set from the side of small focal length and small object distance, and the ranges of the focal length and the object distance are divided by these dividing points into $L_0-L_1, L_1-L_2, \ldots, L_{i-1}-L_i, \ldots, L_{n-1}-L_n$, and each section is approximated to a straight line representing a formula $f_{LZPi} = miD + ni$. Further, mi and ni are represented as follows, and mi and n are so set as to make $\beta_{i-1} > \beta_i$.

$$m_i = (f_i - f_{i-1})/(D_i - D_{i-1})$$

$$n_i = (f_{i-1} D_i - f_i D_{i-1})/(D_i - D_{i-1})$$

Furthermore, $m_i$ and $n_i$ are set so that, with respect to the image magnification at each object distance, image magnification $\beta_i$ of LZP diagram connecting the dividing points $L_0$ and $L_i$, is smaller than that of corresponding AZP diagram of FIG. 3.

LZP diagram may be shifted to the low image magnification side, by remarkably shifting LZP diagram to the low image magnification side at the side of small object distance (small focal length) and setting the same on a constant image magnification at the side of large object distance (large focal length). In the case of this LZP diagram, since, at the near side, the change of the focal length to the long focal length direction is small and the depth of field is large, a scenic photography having a sense of depth can be obtained.

Figure 5:
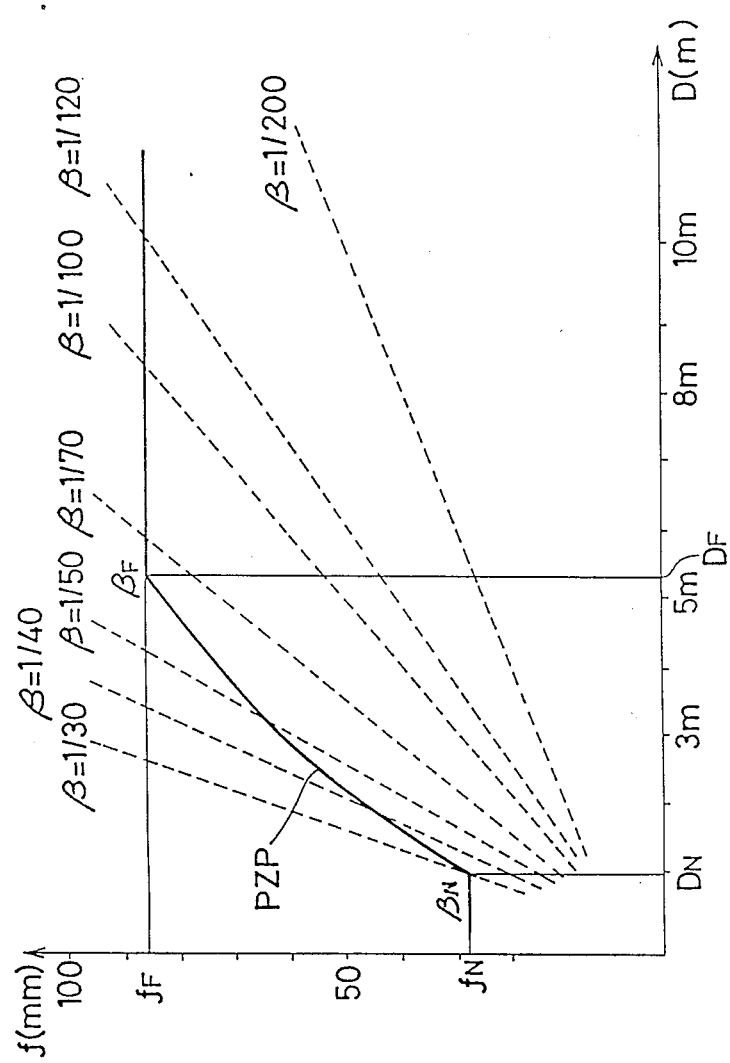
FIG. 5 is a program diagram of a mode (PZP) suitable for portrait photography.

FIG. 5 is a program diagram of a mode (PZP) suitable for portrait photography.

Similarly to the above mentioned LZP diagram, an element of the depth of field is added to PZP diagram. However, unlike LZP diagram, the depth of field of this PZP diagram is small (unsharp effect is high). The curved line of PZP diagram is set as one shifted at the side of large focal length to the small object distance, namely, the high image magnification side.

This PZP diagram representing a formula $f_{PZP} = f(D)$ is, similarly to the diagram of FIG. 4(b), divided into a plurality of sections, and each section is approximately to a straight line representing a formula $f_{PZPi} = miD + ni$. mi and ni are set so as to make $\beta_{i-1} > \beta_i$ and so that, with respect to the image magnification at each object distance obtained by AZP diagram of FIG. 3, the corresponding image magnification $\beta_i$ of PZP diagram is larger.

PZP diagram can be shifted to the high image magnification side by remarkably shifting PZP diagram to the high image magnification side at the side of small object distance (large focal length) and setting the same on a constant image magnification at the side of small object distance (small focal distance). In the case of this PZP diagram, since, at the near side, the change of the focal length to the short focal length direction is small and the depth of field is small, the unsharp effect of the background is heightened, which is advantageous especially for portrait photography.

Figure 6:
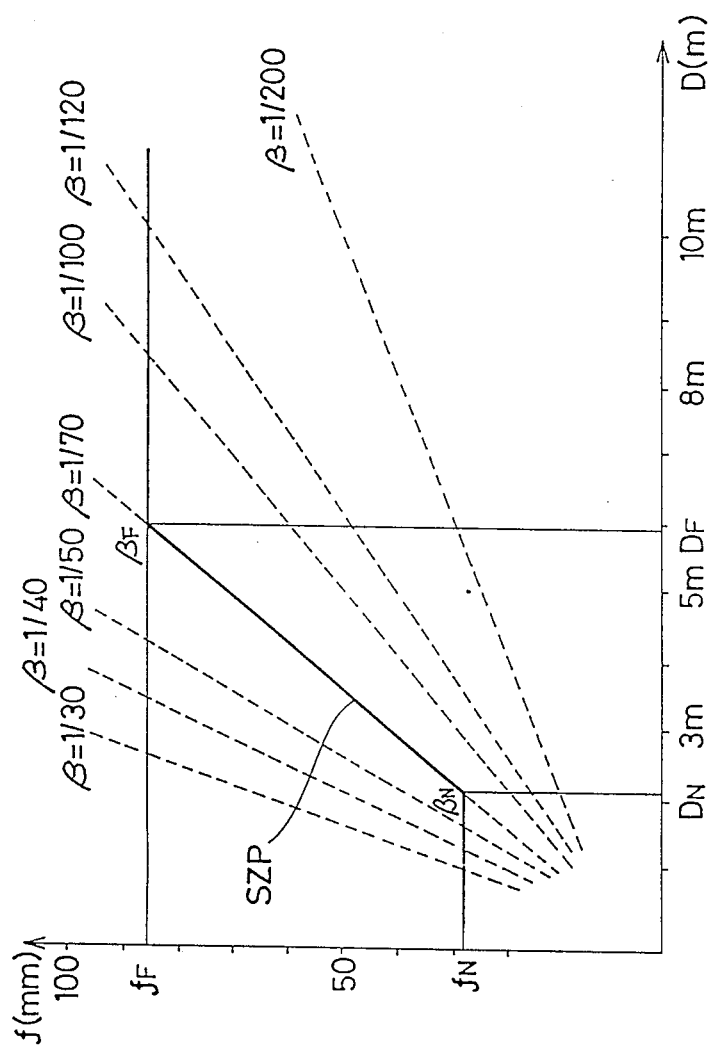
FIG. 6 is a program diagram of a mode (SZP) suitable for photographing moving objects at a constant image magnification.

FIG. 6 is a program diagram of a mode (SZP) suitable for photographing a moving object at a constant image magnification SZP diagram represents a formula $f_{SZP} = f(D) = mD$ so as to make the image magnification constant at any object distance.

Accordingly, as abovemention, $f_{ZP} = f_{AZP}$, $f_{ZP} = f_{LZP}$, $f_{ZP} = f_{PZP}$ and $f_{ZP} = f_{PZP}$ are stored in AZP, LZP, PZP and SZP of FIG. 2 respectively in this order. Further, in LZP and PZP, $f_{ZP} = miD + ni$ corresponding to data of the object distance sections $D_{i-1}$ to $D_1$ are stored.

Now, an example of operation of the microprocessor 1 executing the abovementioned auto-zooming program will be described with reference to a flow chart of FIGS. 8(a), 8(b), 8(c).

Figure 8A:
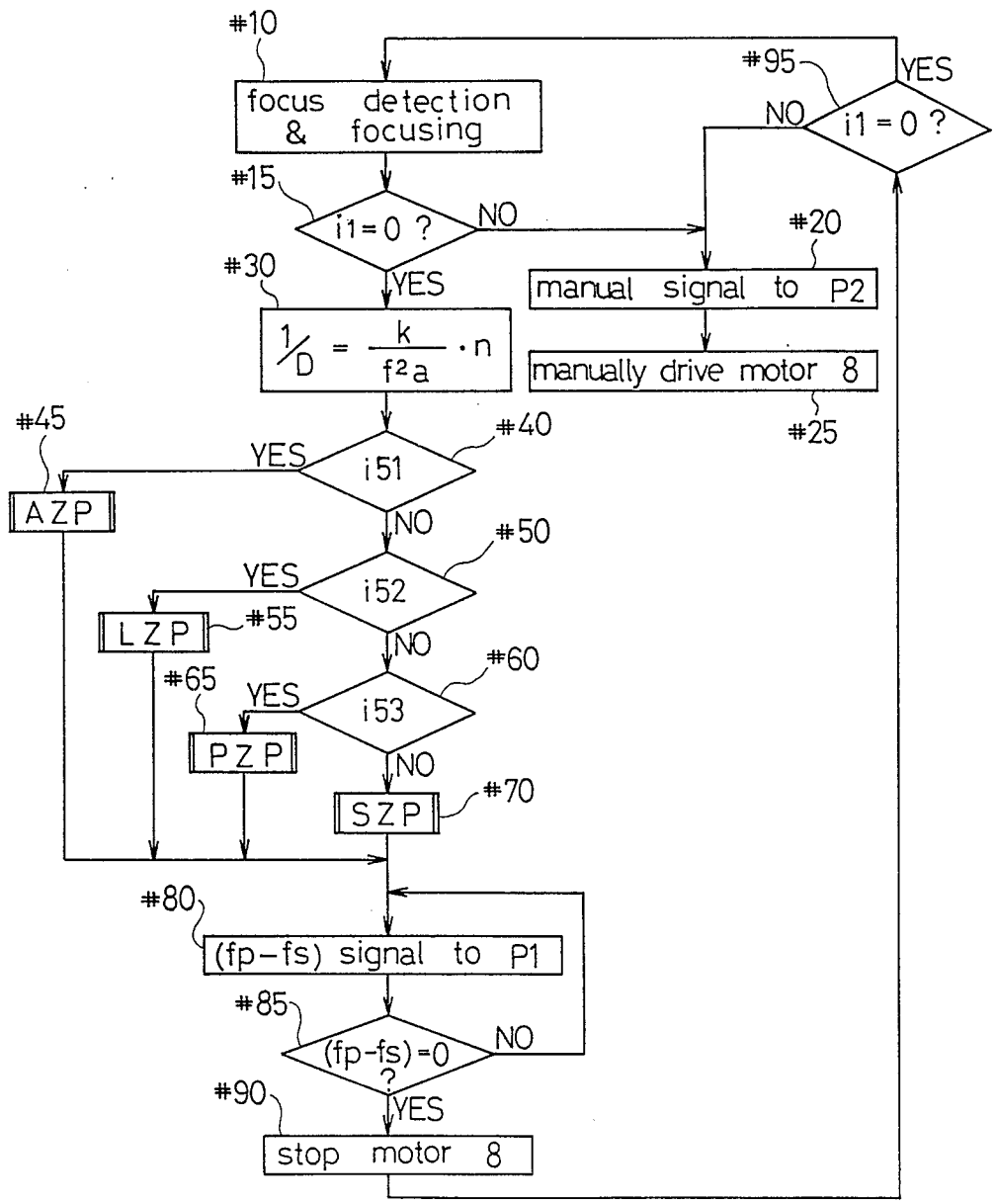
FIGS. 8(a), 8(b) and 8(c) are flow charts for carrying out an auto-zooming program.

Firstly, FIG. 8(a) is referred to.

10; Focus condition detection is executed based on data from the focus detecting section 2. When the focusing lens group LF comes to an in-focus position, the microprocessor 1 stops the rotation of the motor 4. At this time, a count value n of the counter 6 is inputted through the input terminal i4 to the object distance computing means 15.

15; Mode of zooming operation is judged. In usual zooming operation mode, i1=1 and a manual signal representing a direction of rotation designated by a manually operating section 11 is fed from $P_1$ to the motor driving circuit 7 to drive the motor 8 in that direction (#20, #25). When i1=0, the program goes in programmed auto-zooming operation mode and the diagram signals (i51, i52, i53 and i54) corresponding to the programs (AZP, LZP, PZP and SZP) selected by the mode setting section 12 are stored in i5.

30; The object distance D in the in-focus state is computed based on the count value n of the counter 6 inputted through the input terminal i4 and the value $k/f^2a$ of the camera lens inputted through the input terminal i2 and stored.

40, #50 and #60; The set mode of the program diagram is judged. When AZP mode is set, i5=i51 and the program goes in AZP routine at step #45, and when LZP mode is set, i5=i52 and the program goes in LZP routine at step #55, and when PZP mode is set, i5=i53 and the program goes in PZP routine at step #65, and when SZP mode is set, i5=i54 and the program goes in SZP routine at step #70.

Now, AZP routine will be described with reference to a flow chart of FIG. 8(b).

451; Focal length on AZP line of the program diagram shown in FIG. 3, corresponding to value D computed at step #30 is computed from the formula $f_P=mD+n$.

452; It is judged whether $f_P$ is larger than the shortest focal length $f_N$ inputted from the input terminal i2.

453; When $f_P<f_N$, $f_P$ is set to be $f_N$ and stored.

454; When $f_P>f_N$, $f_P$ is compared with the longest focal length $f_F$ at the tele side end. And when $f_P \leq f_F$, $f_P$ is set to be mD+n and stored.

455; When $f_P>f_F$, $f_P$ is set to be $f_F$ and stored.

Now, LZP routine will be described with reference to a flow chart of FIG. 8(c).

551 to #556; It is judged in which range of the program diagram of FIG. 4(a) the value D computed at Step #30 is. When $D<D_1$, D is in $L_0$–$L_1$ range, and $f_P$ is computed using the diagram $f_P=m_0D+n_0$ corresponding to $L_0$–$L_1$ at step #557. Similarly, at steps #558 to #562, $f_P$ is computed relating to each of the cases $D_1 \leq D < D_2$, $D_2 \leq D < D_3$, $D_3 \leq D < D_4$, $D_4 \leq D < D_5$ and $D \leq D_6$, using each of the formulas $f_P=m1D+n1$, $f_P=m2D+n2$.

564,#565; It is judged whether the computed value $f_P$ is within the range from the longest focal length data $f_F$ to the shortest focal length data $f_N$. When $f_P<f_N$, $f_P$ is converted to $f_N$ at step #566, and when $f_P>f_F$, $f_P$ is converted to $f_F$ at step #567.

Figure 8B:
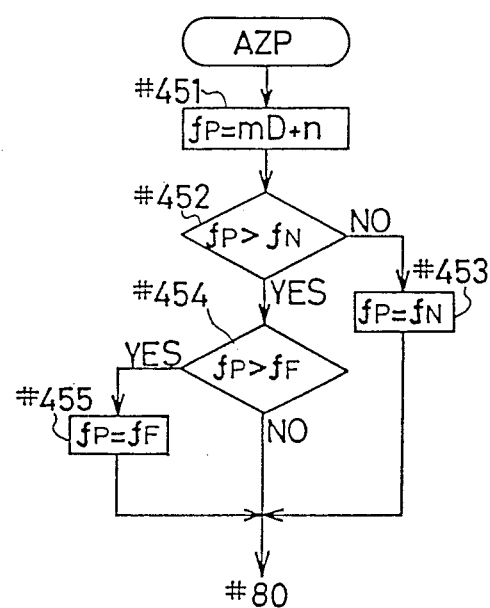
Figure 8C:
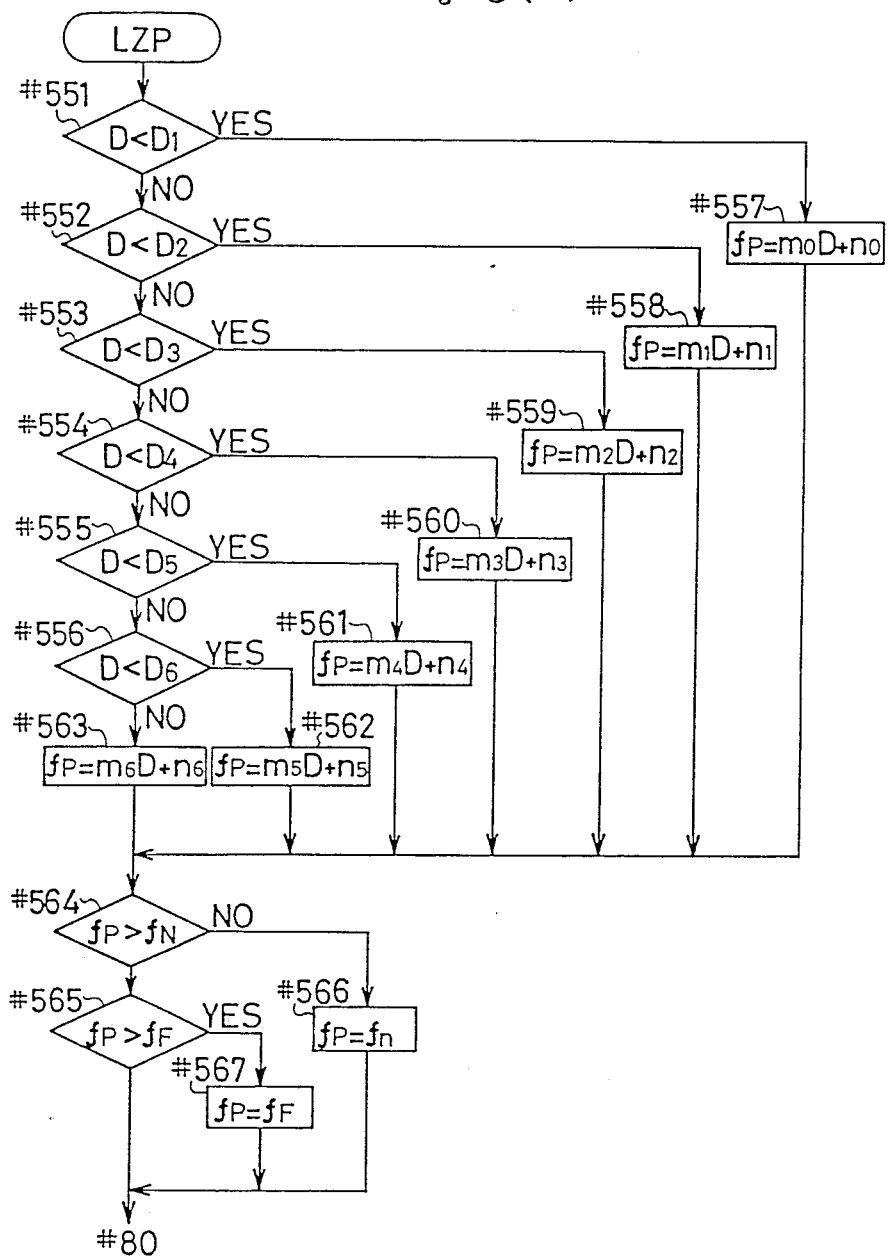

PZP routine is processed similarly to a flow chart of LZP routine shown FIG. 8(c). However, the characteristic of the diagram $f_{ZP}=m1D+n1$ is the same as that of the abovementioned PZP mode.

Further, SZP routine is processed similarly to AZP routine shown in FIG. 8(b). In other words, the focal length data $f_P$ is computed using a formula $f_P=mD$ (m=$\beta$; constant image magnification) and the value D computed at step #30 (FIG. 8a). Then the data $f_P$ is compared with the longest focal length data $f_F$ and the shortest focal length data $f_N$ of the focusing lens, and according to the result of this comparison, $f_P$, $f_F$ or $f_N$ is stored.

Returning to the flow chart of FIG. 8(a), the program from step #80 will be now described.

80; A signal $(f_p-f_S)$ of the difference between $f_P$ computed in the respective mode at steps #40 to #75 and the focal length $f_S$ at the present time fed to the input terminal i2 is fed through the output terminal $P_1$ to the motor driving circuit 7. At this time when the signal $(f_P-f_S)$ is positive, the motor in the right direction, namely, in the direction increasing the focal length, and when negative the motor 8 is driven in the reverse direction, namely, in the direction decreasing the focal length.

85; The difference between $f_P$ and the present focal length $f_S$ inputted through the input terminal i2 based on a digital code of an encoder (BR and CD) momentarily varying in accordance with the rotation of the motor 8 is detected all the time. When the difference is not 0, the signal $(f_P-f_S)$ is continuously issued from P1 at step #80. When the difference becomes 0, the present focal length $f_S$ becomes a predetermined value $f_P$, and accordingly a signal for stopping the rotation of the motor 8 is issued from p1 to stop the motor 8 (#90).

95; After series of operation is completed at steps #10 to #90 then, it is judged whether i1=0 or 1. When i1=1, the program is in usual zooming operation mode, and the program advance to step #20. When i1=0, the program is in programmed auto-zooming operation mode, and then advances to step #10. At step #10, focus condition detecting operation and auto-focusing operation are executed.

Now, another embodiment of the present invention will be described in the following.

In the abovementioned embodiment, the value $f_F$ is compared with the present focal length $f_S$ fed to the input terminal i2 of the microprocessor 1 based on the digital code issued from the encoder (BR and CD) by the drive of the motor 8. However, this step can be executed in the following manner. The output of the encoder (BR and CD) is fed as a monitor signal to the motor driving circuit 7. And when the rotational amount in corresponding with the difference between the present focal length $f_S$ issued from the output terminal p1, and fed to the motor driving circuit 7 and the value $f_P$ in the program diagram becomes the rotational amount in accordance with the encoder (BR and CD), the motor driving circuit 7 stops the rotation of the motor 8. In other words, step #80 in the flow chart of FIG. 8(a) is executed in the motor driving circuit 7.

In the abovementioned first embodiment, the zoom lens is controllingly driven by automatic programmed computing after the focusing lens is controllingly driven to the in-focus position.

Figure 9:
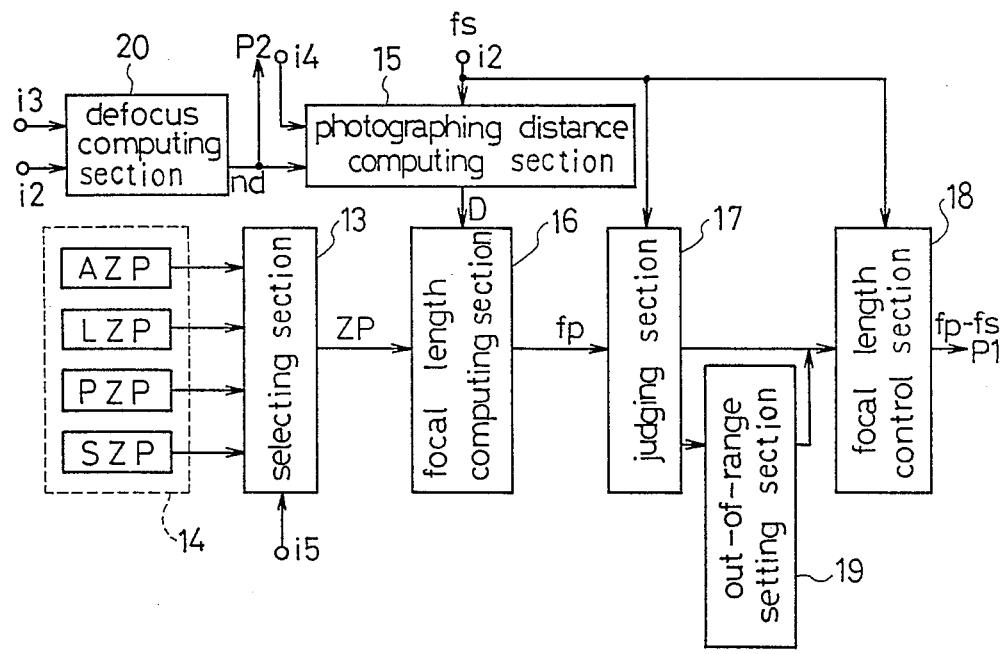
FIG. 9 is a view of the arrangement of a microprocessor of a second embodiment of the present invention, corresponding to FIG. 2 for the first embodiment.
Figure 10:
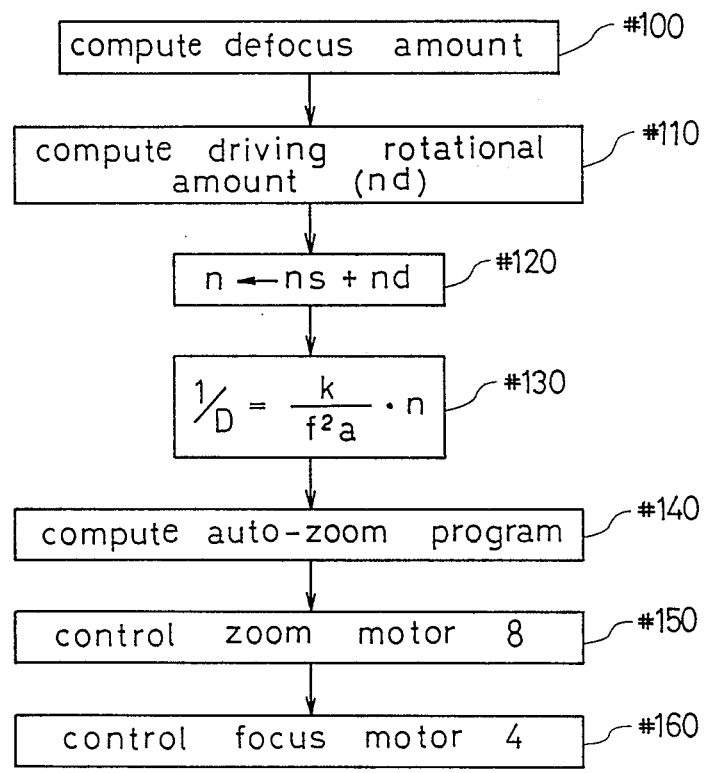
FIG. 10 is a flow chart showing the operation of the second embodiment.

Now, the second embodiment of the present invention will be described with reference to FIG. 9 and 10. FIG. 9 shows the arrangement of this embodiment and FIG. 10 is a flow chart of this embodiment. In this second embodiment, a focus lens is controllingly driven to the in-focus position after a zoom lens is controllingly driven by automatic programmed computing. The arrangement shown in FIG. 9 is such that a defocus computing means 20 is added in front of the object distance computing means 5 in the arrangement shown in FIG. 2. The defocus computing means 20 computes a defocus amount ($\Delta L$) based on a focus detecting data inputted through the input terminal i3, also computes a focus driving rotational amount (nd) based on the defocus amount ($\Delta L$), and a focusing lens extension amount converting data ($\Delta d/\Delta L$), and outputs the value (nd) to the output terminal P2 and the object distance computing means 15. The motor 4 is driven according to the driving rotational amount (nd) outputted from the output terminal P2 to the motor driving circuit 3 so as to drive the focusing lens group $L_F$ to the infocus position. On the other hand, the object distance computing means 15 computes a count value n from the retracted position ($\infty$) of the focusing lens to the in-focus position thereof by adding the driving rotational amount (nd) and the count value ns of the present position in out-of-focus state switch is inputted through the input terminal i4. Further, the object distance computing means 15 computes a object distance data D from a data ($K/f^2a$) peculiar to the focusing lens inputted through the input terminal i2 and the abovementioned count value n, and outputs the data D to the focal length computing means 16.

The other parts of the arrangement of this embodiment than described above are similar to those of FIG. 2.

Now, the operation of this embodiment will be described with reference to FIG. 10.

100; The defocus amount ($\Delta L$) is computed by the defocus computing means 20.

110; The focus driving rotational amount (nd) is computed by the defocus computing means 20 based on the defocus amount ($\Delta L$) and the extension amount converting data ($\Delta d/\Delta L$), and this rotational amount (nd) is stored.

120; The count value n from the retracted position ($\infty$) to the in-focus position is computed by adding the rotational amount (nd) and the count value ns of the present position.

130; The object distance data D is computed from the data ($k/f^2a$).

140; The focal length $f_P$ corresponding to each program diagram is computed based on the object distance D. #150; The zoom motor 8 is driven by the zoom motor driving circuit till the focal length $f_S$ at the present time reaches the computed focal length $f_P$, and when reaches, the zoom motor 8 is stopped.

160; The rotational amount (nd) computed at step #110 is outputted through the output terminal P2 to the focus motor driving circuit 3 to drive the focus motor 4, and the pulse number of the encoder 5 is counted. When the pulse number reaches 0, the motor is stopped.

As abovementioned, by making it possible to select one of program diagram setting modes, a depth of field can be optionally selected even in photographing at a constant object distance, so that a depth of field can be set to be suitable for each case of photographing.

Figure 11:
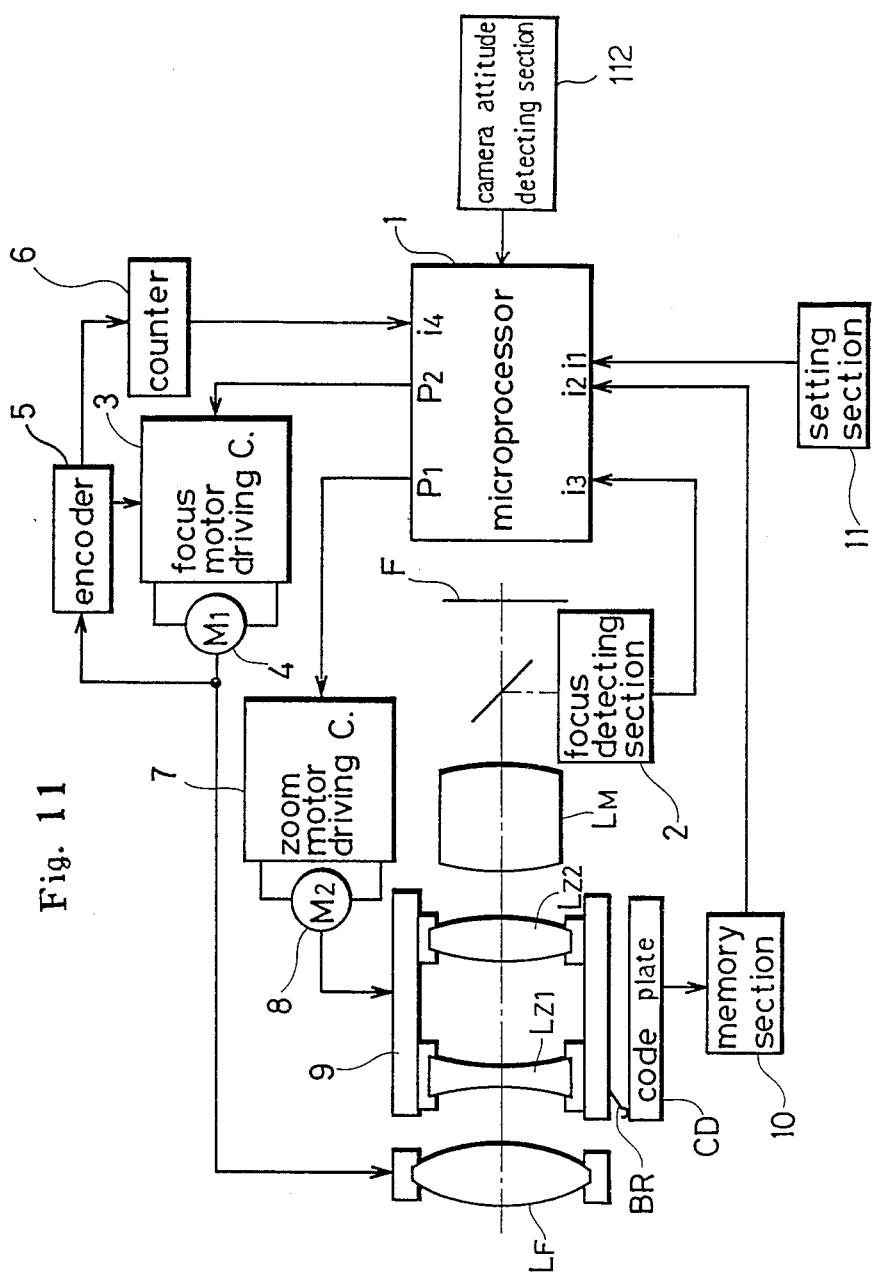
FIG. 11 is a view of the arrangement of a third embodiment of a zoom camera according to the present invention.

FIG. 11 shows the arrangement of the third embodiment of the present invention. In this embodiment, a camera attitude detecting section 112 is provided instead of the mode setting section 12 in the first embodiment.

Figure 13:
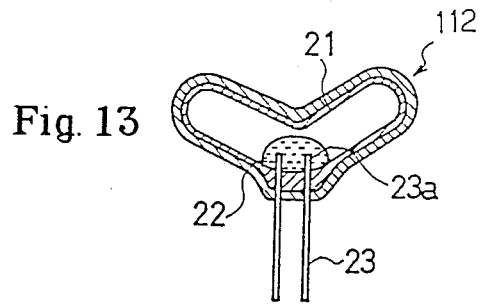
FIG. 13 is a structural view of a mercury switch.

The camera attitude detecting section 112 comprises a mercury switch as shown in FIG. 13. The vertical or horizontal camera attitude is detected by the mercury switch. In FIG. 13, in a V-shaped glass container 21 and terminals 23a of a pair of lead wires 23 are opposed to each other. When the glass container is inclined according to the change of the camera attitude, the mercury 22 flows within the glass container 21 to put the terminals 23a in the short-circuited or opened state. In other words, for example, the terminals 23a are short-circuited in the horizontal camera attitude to turn on the mercury switch, while the terminals 23a are opened in the vertical camera attitude to turn off the mercury switch. And the camera attitude detecting section 112 outputs a signal in correspondence with ON or OFF state of the mercury switch to the microprocessor 1.

Figure 12:
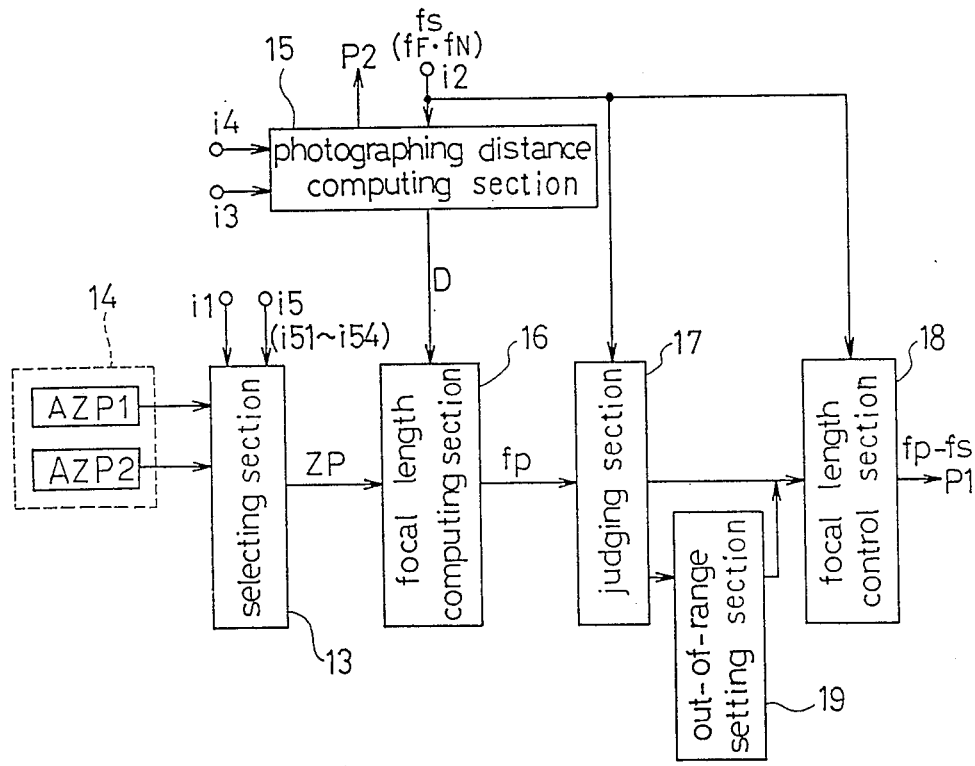
FIG. 12 is a block diagram of a microprocessor applied to the third embodiment.

The input and output data of the microprocessor 1 will be described with reference to FIG. 11 and FIG. 12 showing a block diagram of the microprocessor 1.

An operation mode set by the setting section 11 is inputted through the input terminal i1. A signal i1=0 is inputted through the input terminal i1 in programmed auto-zooming operation mode, while a signal i1=0 is inputted therethrough in usual zooming operation mode. An ON or OFF signal in correspondence to the camera attitude detected by the mercury switch in the camera attitude detecting section 112 is outputted from the section 112, and inputted through the input terminal i5 into the selecting means 13. A signal i5=0 is inputted in the selecting means 13 in the case of the horizontal camera attitude, and i5=1 is inputted therein in the case of the vertical camera attitude. In the selecting means 13, a program diagram AZP1 is selected when i5=0, and AZP2 is selected when i5=1, and inputted in the focal length computing means 16.

Other input data are the same as abovementioned with respect to the first embodiment.

Figure 14:
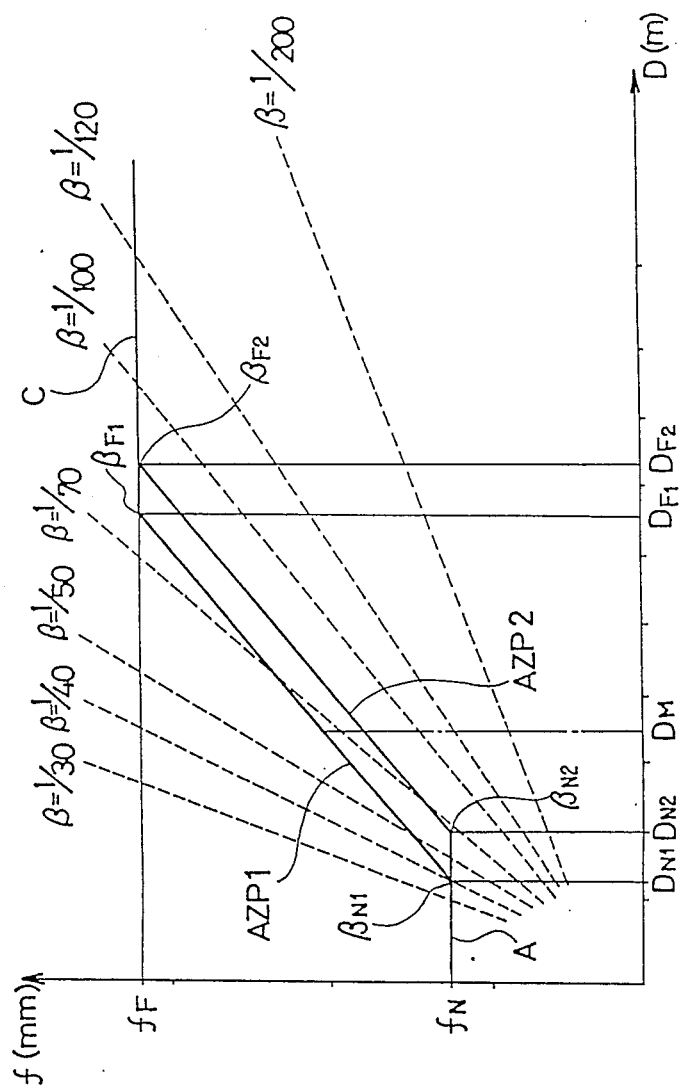
FIG. 14 is a program diagram with respect to the photographing distance and the focal length in the third embodiment.

FIG. 14 shows program diagrams of a mode suitable for snapshot, and AZP1 and AZP2 are program diagrams for the vertical and horizontal camera attitudes respectively. AZP1 and AZP2 are different from each other only in the image magnification.

In AZP1 and AZP2, an object at near side can be photographed to be large in the photographing scene and an object on far side can be photographed to be small in the photographing scene. However, these image magnifications do not vary so much as the image magnification varies with a constant focal length, and varies only about a constant image magnification.

Further in FIG. 14, the image magnification of the program diagram AZP2 for the vertical camera attitude within the range of its line is set to be smaller than that of the program diagram AZP1 for the horizontal camera attitude.

The difference between these image magnification will be described in the following.

Figure 15A:
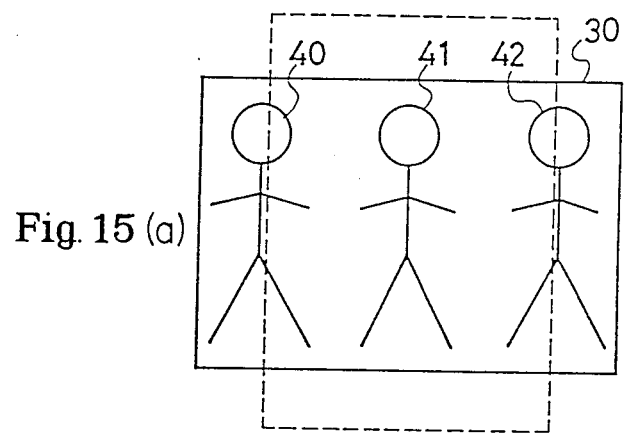
FIGS. 15 (a) and 15(b) are views showing the photographing scenes for explaining the program diagram of FIG. 14.

FIGS. 15(a),(b) show photographing scene frames 30 in the vertical and horizontal attitudes respectively of a 35 mm camera (24 mm in length ×36 mm in width).

Figure 15B:
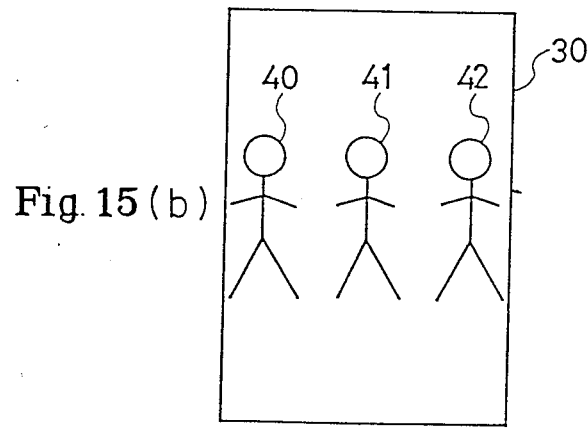

It is supposed that an objects 40 to 42 (for example, persons) moving from the near side to the far side are now being photographed in the horizontal camera attitude as shown in FIG. 15 (a). In this case, the image magnification becomes gradually smaller according to the program diagram AZP1 shown in FIG. 14. Here, it is supposed that all the objects 40 to 42 are included within the horizontal photographing scene frame 30. When, at an object distance $D_M$ on the way of this photographing in the horizontal camera attitude (on the line of the program diagram AZP1), the camera attitude is turned from horizontal to vertical, the photographing scene frame 30 of FIG. 15(a) changes to one shown with a hatching line. And among the objects framed to be included in the horizontal photographing scene, the objects 40, 42 at both ends are put outside of the vertical photographing scene frame.

Here, by changing over the program diagram from AZP1 line to AZP2 line and decreasing the image magnification than that of AZP1, the objects 40, 42 at both ends are also included within the vertical photographing scene frame 30 similarly to the case of the horizontal one. Further, when the objects move to the far side, the image magnification on the line AZP2 becomes gradually smaller. If the camera attitude is changed in such a manner, the target objects can be included correctly within the photographing scene frame, and further, the size of the objects continuously varies with respect to the photographing scene.

The image magnification of the program diagrams AZP1 and AXP2 are set as described below so that objects can be included at a similar size ration within the vertical and horizontal photographing scene frames.

Now, indications are determined as follows.

$\beta_{AZP1}$: image magnification of AZP1 (horizontal attitude) at object distance D $\beta_{AZP2}$: image magnification of AZP2 (vertical attitude) at object distance D $f_1$: focal length of AZP1 (horizontal attitude) at object distance D $f_2$: focal length of AZP2 (vertical attitude) at object distance D D: object distance The following formulas are obtained.

$$\beta_{AZP1} = f_1/D \quad (3)$$

$$\beta_{AZP2} = f_2/D \quad (4)$$

In order to obtain similar size ratio of an object with respect to a vertical and horizontal photographing scene, the angles of view in the horizontal and vertical camera attitudes have to be equalified.

The indications are determined as follows.

$2\omega Y$: angle of view in the vertical camera attitudes $2\omega T$: angle of view in the horizontal camera attitudes dT: length of photographing scene dY: width of photographing scene The following formulas are obtained.

$$2\omega Y = 2 \tan^{-1}(dY/2f_1)$$

$$2\omega T = 2 \tan^{-1}(dT/2f_2)$$

In order to make $2\omega Y = 2\omega T$, $$dY/2f_1 = dT/2f_2$$

therefore $$f_2 = (dT/dY) \cdot f_1 \quad (5)$$

By substituting the formula (5) for the formula (4), $$\beta_{AZP2} = \frac{dT}{dY} \cdot \frac{f_1}{D} \quad (6)$$

therefore $$\beta_{AZP2} = (dT/dY) \cdot \beta_{AZP1}$$

Accordingly, the image magnification of AZP2 line has to be set so as to realize the abovementioned equation. In the case of a 35 mm camera, the image magnification is set so as to satisfy the equation $$\beta_{AZP2} = (2/3) \cdot \beta_{AZP1}$$

Further, in memories for AZP1 and AZP2 shown in FIG. 12, $f_{AZP1}$ corresponding to the abovementioned formula (3) and $f_{AZP2}$ corresponding to the abovementioned formula (6) are stored as functions of mD+n respectively.

Figure 16:
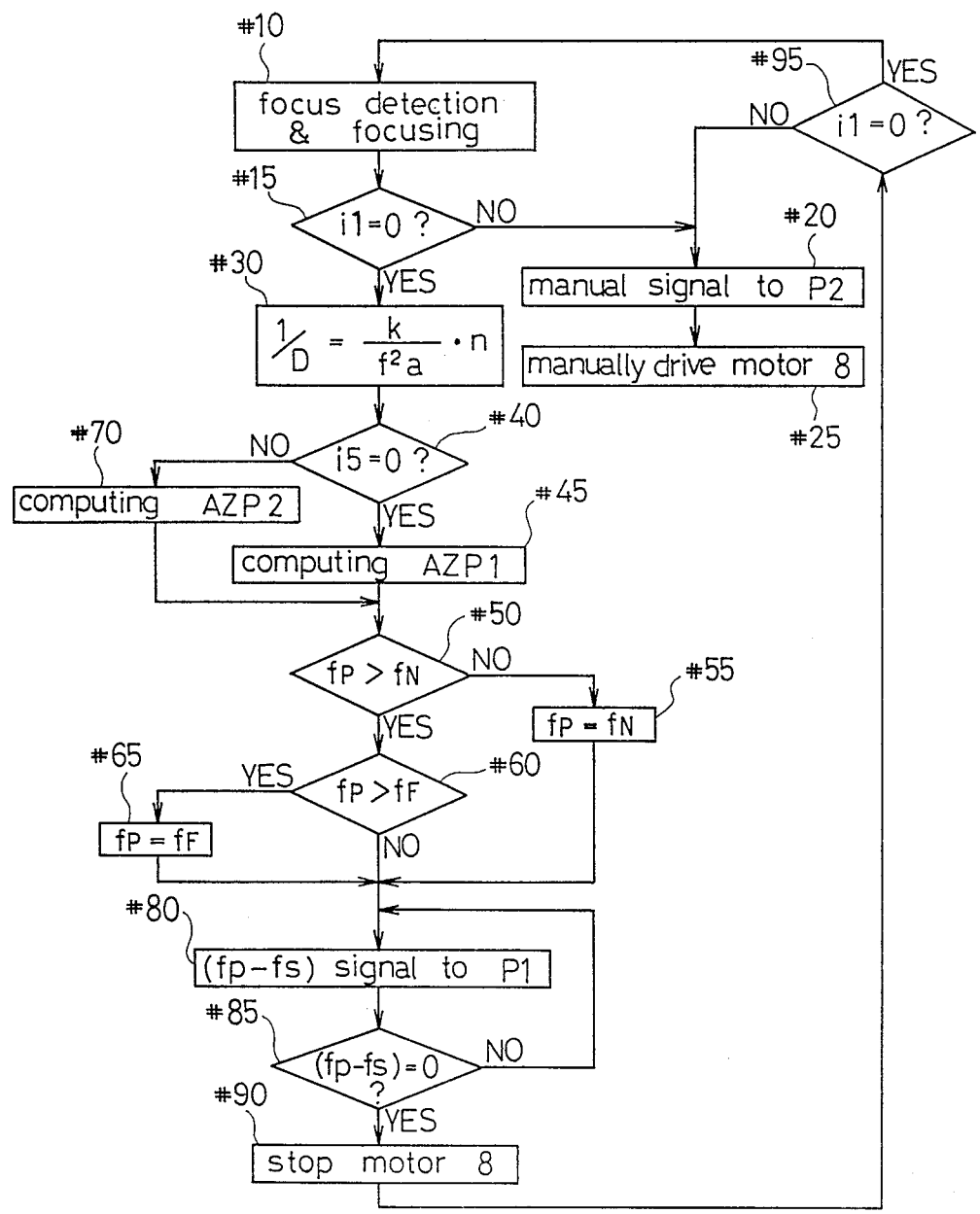
FIG. 16 is a flow chart for carrying out an auto-zooming program of the third embodiment.

Now, an example of the operation of the microprocessor 1 for executing the abovementioned autozooming program will be described with reference to a flow chart shown in FIG. 16.

10 to #30; These steps are the same as abovementioned with reference to FIG. 8(a) and the description thereof is omitted here.

40; It is judged which of the program lines AZP1 and AZP2 is to be used for computing the focal length, based on the signal i5=0 or i5=1 corresponding to the horizontal or vertical camera attitude detected by the camera attitude detecting section 112.

45; When i5=0, the camera attitude is horizontal and therefore, the focal length $f_P$ is computed according to the program line AZP1 based on the object distance D computed at step #30.

50; It is judged whether the focal length $f_P$ is larger than the shortest focal length $f_N$ of the focusing lens inputted through the input terminal i5.

55; When $f_P$ is smaller than $f_N$, $f_P$ is set to be $f_N$ and this value is stored.

60; When $f_P$ is larger than $f_N$, $f_P$ is compared with the longest focal length $f_F$. When $f_P \leq f_F$, the value of $f_P$ computed according to the program line AZP1 at step #45 is stored.

65; When $f_P > f_F$, $f_P$ is set to be $f_F$ and this value is stored.

70; When i5=1 at step #40, the camera attitude is vertical, and therefore, the focal length $f_P$ is computed according to the program diagram AZP2 based on the object distance D computed at step #30. Thereafter, the same computations as executed at steps #50 to 65 are executed and the $f_P$ is stored.

80 to #95; These steps are the same as abovementioned with reference to FIG. 8(a) and the description thereof is omitted here.

In the abovementioned embodiment, the focal length $f_S$ at the present time based on a digital code issued from the encoder (BR and CD) is successively inputted through the input terminal i2 into the microprocessor 1. However, instead of such arrangement, step #80 in the flow chart of FIG. 16 can be executed by the motor driving circuit 7.

Figure 17:
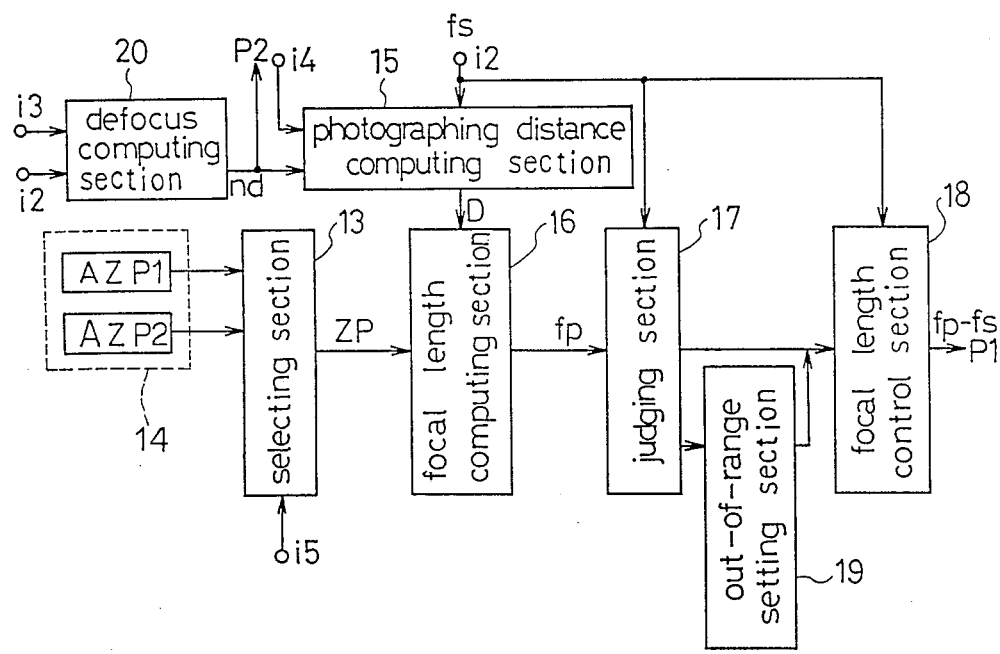
FIG. 17 is a block diagram of a microprocessor applied to the second embodiment.

Now, the fourth embodiment will be described with reference to FIG. 17, in which after a zoom lens is controllingly driven according to a data obtained by programmed automatic computation, a focusing lens is controllingly driven to the in-focus position. In FIG. 17, similarly to the abovementioned FIG. 9, a defocus computing means 20 is added in front of the object distance computing means 15. The operation of this embodiment is the same as abovementioned.

The abovementioned program diagram is suitable for snapshot of a group of persons or the like.

Now, the fifth embodiment will be described in which a program diagram suitable for portrait photography for closing up the face or upper half body of a person.

Figure 18:
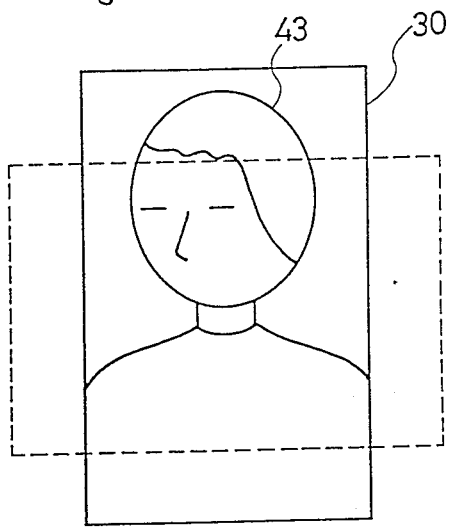
FIGS. 18(a) and 18(b) are views showing the photographing scenes for explaining a program diagram of the fifth embodiment.
Figure 18:
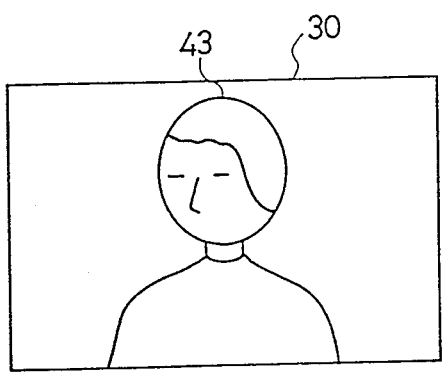

FIGS. 18(a),(b) show photographing scene frames of 35 mm size (24 mm in length 36 mm in width) in the horizontal and vertical attitudes used in portrait photography. Now, an object 43 is framed so that the upper half body of the object 43 is included within a vertical photographing scene frame 30 (shown with a solid line) shown in FIG. 18(a). When the camera attitude is turned to horizontal without changing the object distance, the photographing scene frame 30 changes to one shown with a hatching line and the head of the person is put outside of the photographing scene frame. Accordingly, the image magnification used in photographing in the horizontal camera attitude is set to be smaller than that used in photographing in the vertical camera attitude so that the upper half body of the person can be included within the horizontal photographing scene frame 30 as shown in FIG. 18(b). This can be achieved by setting the program line AZP1 for photographing in the vertical camera attitude and AZP2 for photographing in the horizontal camera attitude. The focal length $f_2$ AZP2 for photographing in the horizontal camera attitude is set as $f_2=(2/3)\cdot f_1$, and the arrangement and the flow chart for this operation are the same as above-mentioned in the third embodiment.

Now, the sixth embodiment will be described relating to the relation between the kind of a zoom lens and a program line used. The third embodiment described with reference to FIGS. 15(a)(b) is suitable mainly for a wide-angle zoom lens. The fifth embodiment described with reference to FIGS. 18(a)(b) is suitable for a telephoto zoom lens. In a camera system in which a wide-angle zoom lens and a telephoto zoom lens are interchangeable, each of a wide-angle zoom lens and a telephoto zoom lens can be applied by making it possible to change over a first program line in which the image magnification becomes small in photographing in the vertical camera attitude and a second program line in which the image magnification becomes small in photographing in the horizontal camera attitude in the microprocessor 1 using the longest focal distance data $f_F$ and the shortest focal length data $f_N$ inputted from the memory 10 of the focusing lens.

Figure 19:
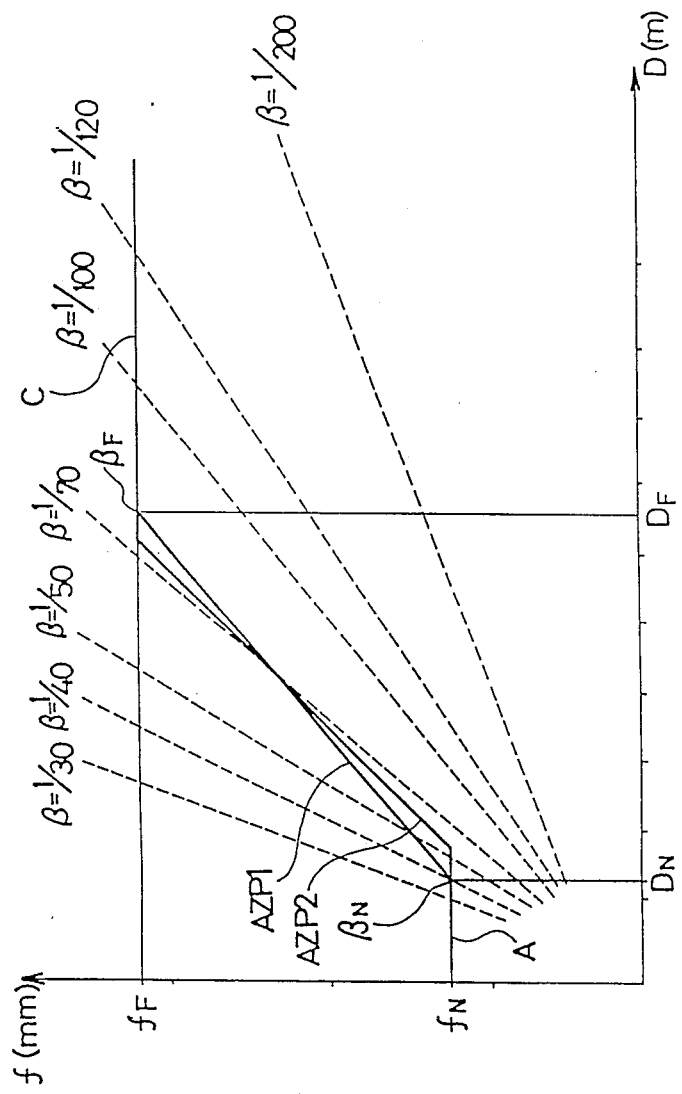
FIG. 19 is a program diagram with respect to the object distance and the focal length in the fifth embodiment.

FIG. 19 shows a program diagram suitable for a zoom lens usable as a wide-angle zoom lens and a telephoto zoom lens. In FIG. 19, a program line AZP1 is for photographing in the horizontal camera attitude and a program line AZP2 is for photographing in the vertical camera attitude. The wide-angle side is frequently used for snapshot, and therefore the image magnification used in photographing in the vertical camera attitude is set to be smaller than that used in photographing in the horizontal camera attitude ($\beta_{AZP1} > \beta_{AZP2}$). On the other hand, the telephoto side is frequently used for portrait photography, the image magnification used in photographing in the vertical camera attitude is set to be larger than that used in photographing in the horizontal camera attitude ($\beta_{AZP1} < \beta_{AZP2}$). As a result, two program lines AZP1 and AZP2 are connected by a line from the near side end to the far side end. The arrangement and the flow chart of this embodiment are the same as described in the abovementioned embodiments.

In the description of the abovementioned embodiments, the image magnification of each of program lines changes in accordance with the object distance. However, these embodiments can be also applied to program lines of which the image magnification is constant irrelevant to the object distance. While the embodiments of the present invention, as herein described, constitute a preferred form, it is to be understood that other forms might be adopted.

What is claimed is:

1. A zoom camera comprising, a focusing lens group and a zoom lens group, a controllingly driving system for controllingly driving these lens groups in accordance with a program line, an object distance detecting means for detecting the distance from the camera to an object to be photographed, an image magnification setting means for setting the image magnification in accordance with a predetermined program based on the object distance and the depth of field, and a computing means for computing such a focal length as to obtain a specified value of image magnification based on output signals from the object distance detecting means and the image magnification setting means and feeding the obtained focal length data to the controllingly driving system.

2. A zoom camera as claimed in claim 1, wherein the specified value of the image magnification of the program line is so set that the depth of field of the program line is larger than the depth of field of a second program line extending substantially as a strait line from a first point representing an image magnification $\beta_N$ of an object at near side to a second point representing an image magnification $\beta_F$ of an object at far side with the image magnification $\beta_N$ being larger than the image magnification $\beta_F$ in a program diagram.

3. A zoom camera as claimed in claim 2, wherein the specified value of the image magnification is so set that the image magnification at an object distance is smaller than the corresponding image magnification at the same object distance of the second program line.

4. A zoom camera as claimed in claim 2, wherein the image magnification is so set as to be smaller than the corresponding image magnification of the second program line at a smaller object distance side.

5. A zoom camera as claimed in claim 1, wherein the specified value of the image magnification of the program line is so set that the depth of field of the program line is smaller than the depth of field of a second program line extending substantially as a straight line from a first point representing an image magnification $\beta_N$ of an object at near side to a second point representing an image magnification $\beta_F$ of an object at far side with the image magnification $\beta_N$ being larger than the image magnification $\beta_F$ in a program diagram.

6. A zoom camera as claimed in claim 2, wherein the specified value of the image magnification is so set that the image magnification at an object distance is larger than the corresponding image magnification at the same object distance of the second program line.

7. A zoom camera as claimed in claim 5, wherein the image magnification is so set as to be larger than the corresponding image magnification of the second program line at a larger object distance side.

8. A zoom camera as claimed in claim 1, wherein the object distance detecting means comprises
   a focus detecting section for receiving a light passing the lens groups and detecting a defocus amount of the lens group,
   a means for computing, based on the defocus amount, a lens driving amount required to move the focusing lens group to an infocus position, and a means for computing the object distance based on a shift amount of the focus lens group from a predetermined position and the said lens driving amount.

9. A zoom camera having a focusing lens group and a zoom lens group in which these lens groups are controllingly driven according to a program line, comprising
    a memory means for storing a plurality of program lines,
    a selecting means for selecting a program line from the memory means and outputting a signal representing the selected program line,
    a first computing means for computing an object distance based on a signal representing a lens driving amount required to move the focusing lens group to an in-focus position, and outputting an object distance signal,
    a second computing means for computing a focal length based on the signal representing the selected program line and the object distance signal, and outputting a focal distance signal, and
    a zoom control means for controllingly driving the zoom lens according to the focal length signal.

10. A zoom camera as claimed in claim 9, further comprising,
    a focus detecting means for receiving a light passing the lens groups and detecting a defocus amount of the lens groups,
    a means for computing, based on the defocus amount, a lens driving amount required to move the focusing lens group to an infocus position, and
    a focus control means for controllingly driving the focusing lens group according to a signal representing the lens driving amount.

11. A zoom camera as claimed in claim 10, wherein the first computing means computes the object distance based on the lens driving amount outputted from the lens driving amount computing means and a shift amount of the focusing lens from a predetermined position.

12. A zoom camera as claimed in claim 9, further comprising a camera attitude detecting means for detecting whether the camera attitude is horizontal or vertical, and outputting a selection signal based on the detected camera attitude.

13. A zoom camera as claimed in claim 9, further comprising a focus detecting means for detecting that the zoom lens group reaches one end of zooming range, and outputting a selection signal based on the detection.

14. A zoom camera comprising, a focusing lens group and a zoom lens group, a controllingly driving system for controllingly driving these lens groups in accordance with a program line, an object distance detecting means for detecting the distance from the camera to an object to be photographed, an image magnification setting means for setting the image magnification in accordance with a predetermined program based on the object distance, a camera attitude detecting means for detecting whether the camera attitude is horizontal or vertical, a computing means for computing such a focal length as to obtain a specified value of image magnification based on output signals from an image magnification setting means selected according to the camera attitude detected by the camera attitude detecting means and from the object distance detecting means, and outputting the obtained focal length data to the controllingly driving system.

15. A zoom camera as claimed in claim 14, wherein the image magnification set by an image magnification setting means changes in accordance with the object distance.

16. A zoom camera as claimed in claim 15, wherein the image magnification is set by an image magnification setting means in such a manner that the image magnification of an object on near side is larger than the image magnification of an object on far side.

17. A zoom camera as claimed in claim 14, wherein the image magnification setting means has different image magnifications for photographing in the horizontal or vertical camera attitude, and the image magnifications are set in such a manner that the size ratios of an object to vertical and horizontal photographing scene frames are the same.

18. A zoom camera as claimed in claim 14, wherein the image magnification setting means sets the image magnification in such a manner that the image magnification for photographing in the vertical camera attitude is smaller than the corresponding image magnification for photographing in the horizontal camera attitude.

19. A zoom camera as claimed in claim 18, wherein the lens group constitutes a wide-angle zoom lens.

20. A zoom camera as claimed in claim 14, wherein the image magnification setting means sets the image magnification in such a manner that the image magnification for photographing in the horizontal camera attitude is smaller than the corresponding image magnification for photographing in the vertical camera attitude.

21. A zoom camera as claimed in claim 20, wherein the lens group constitutes a telephoto zoom lens.

22. A zoom camera as claimed in claim 14, wherein the image magnification setting means sets the image magnification in such a manner that when the focal length is short, the image magnification for photographing in the vertical camera attitude is smaller than the corresponding image magnification for photographing in the horizontal camera attitude, and when the focal length is long, the image magnification for photographing in the horizontal camera attitude is smaller than the corresponding image magnification for photographing in the vertical camera attitude.

* * * * *